US006891819B1

(12) United States Patent
Inoue et al.

(10) Patent No.: US 6,891,819 B1
(45) Date of Patent: May 10, 2005

(54) MOBILE IP COMMUNICATIONS SCHEME INCORPORATING INDIVIDUAL USER AUTHENTICATION

(75) Inventors: Atsushi Inoue, Kanagawa-ken (JP); Masahiro Ishiyama, Tokyo-to (JP); Atsushi Fukumoto, Kanagawa-ken (JP); Yoshiyuki Tsuda, Kanagawa-ken (JP); Toshio Okamoto, Tokyo-to (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/146,952

(22) Filed: Sep. 4, 1998

(30) Foreign Application Priority Data

Sep. 5, 1997 (JP) ............................................. 9-241163
Sep. 5, 1997 (JP) ............................................. 9-241167

(51) Int. Cl.[7] ............................................. H04L 12/22
(52) U.S. Cl. ...................................... 370/338; 370/401
(58) Field of Search ................................... 370/328, 338, 370/389, 392, 401, 331, 400, 402, 403, 404, 332, 333; 713/168, 170, 183; 455/432.1, 435.1, 410, 411, 433

(56) References Cited

U.S. PATENT DOCUMENTS

| 5,159,592 | A | * | 10/1992 | Perkins | 370/85 |
| 5,325,362 | A | * | 6/1994 | Aziz | 370/94.3 |
| 5,668,876 | A | * | 9/1997 | Falk et al. | 380/271 |
| 5,729,537 | A | * | 3/1998 | Billstrom | 370/329 |
| 5,793,762 | A | * | 8/1998 | Penners et al. | 370/389 |
| 5,907,804 | A | * | 5/1999 | Schroderus et al. | 455/411 |
| 6,061,650 | A | * | 5/2000 | Malkin et al. | 704/228 |
| 6,075,776 | A | * | 6/2000 | Tanimoto et al. | 370/254 |
| 6,243,758 | B1 | * | 6/2001 | Okanoue | 709/238 |
| 2001/0041571 | A1 | * | 11/2001 | Yuan | 455/445 |

FOREIGN PATENT DOCUMENTS

| JP | 05-241998 | 9/1993 |
| JP | 09-153891 | 6/1997 |

OTHER PUBLICATIONS

Perking, "IP Mobility Support" *Network Working Group* pp. 1–79 (1996).
Kentaro Hayashi et al., "A Study of Control Information Transmission Method in Personal Communication Using an ATM Network", pp. 51–56 (1992).

* cited by examiner

*Primary Examiner*—Chau Nguyen
*Assistant Examiner*—Duc Duong
(74) *Attorney, Agent, or Firm*—Foley & Lardner LLP

(57) ABSTRACT

A mobile IP communication scheme capable of authenticating an individual user who is operating the mobile computer when the mobile computer is connected to a visited site network and transmits a current location registration message to the home agent is disclosed. A user authentication to judge a properness of a user of the mobile computer is carried out according to a user input based information, and the current location of the mobile computer is registered at the mobile computer management device (home agent) when the user is judged as a proper user. The user authentication can be carried out either at the mobile computer management device according to a user input based information received from the mobile computer, or at the mobile computer according to an information entered by the user at the mobile computer.

17 Claims, 13 Drawing Sheets

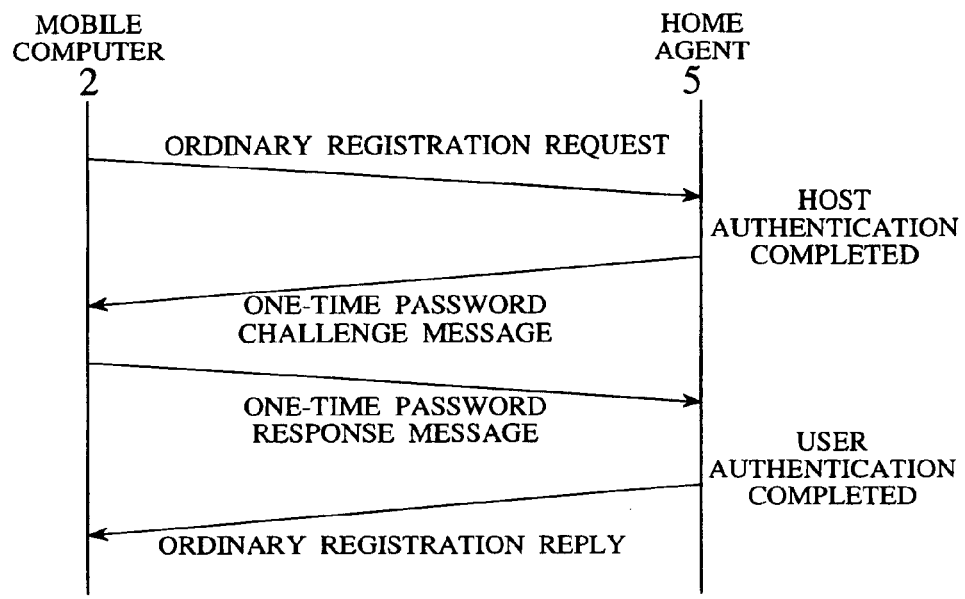

MOBILE IP COMMUNICATIONS SCHEME INCORPORATING INDIVIDUAL USER AUTHENTICATION

BACKGROUND OF THE INVENTION

1. Field of the Invention

The present invention relates to a mobile IP communication scheme, and more particularly, to a mobile computer device capable of carrying out communications while moving over networks in a system formed by a plurality of computers for providing necessary services by exchanging data among a plurality of inter-connected networks, and a mobile computer management device for managing a moving location information of the mobile computer and transferring packets destined to the mobile computer to a current location of the mobile computer, as well as a communication system and a mobile computer registration method suitable for these devices.

2. Description of the Background Art

In conjunction with availability of a computer system in smaller size and lower cost and a more enriched network environment, the use of computer system has been rapidly expanded into variety of fields, and there is also a transition from a centralized system to a distributed system. In this regard, in recent years, because of the advance and spread of the computer network technology in addition to the progress and improved performance of the computer system itself, it has become possible to realize not only a sharing of resources such as files and printers within an office but also communications (electronic mail, electronic news, file transfer etc.) with outside of an office or organization, and these communications are now widely used.

In particular, in recent years, the use of the world's largest computer network called "Internet" has become very popular, and there are new computer businesses for connecting to the Internet and utilizing open information and services, or for providing information and services to external users who make accesses through the Internet. In addition, new technology is developed in relation to the use of the Internet.

Also, in conjunction with the spread of such networks, there are technological developments regarding the mobile computing. In the mobile computing, a user carries along a portable computer terminal and makes communications while moving over networks. In some cases, the user may change a location on a network while continuing the communication, so that there is a need for a scheme that manages a changing address of a mobile computer on a network during such a communication in order to route the communication content correctly.

In general, in a case of realizing the mobile computing, a router (home agent) for managing the visiting site information of the mobile computer is provided at a network (home network) to which the mobile computer belongs, and when the mobile computer is away from the home network, the mobile computer sends a registration message for indicating a current location to this home agent. When this registration message is received, the transmission of data destined to the mobile computer is realized by capturing it by the home agent of the mobile computer, and carrying out the data routing control with respect to the mobile computer by encapsulating an IP packet destined to an original address of the mobile computer within a packet destined to a current location address of the mobile computer.

For example, in FIG. 1, this role is played by a home agent (HA) 5 in a case where the mobile computer 2 that originally belongs to the home network 1a moves to another network 1b and carries out the communication with another computer (correspondent host: CH) 3 within the other network 1c. This is a scheme called mobile IP which is currently in a process of being standardized by the mobile-IP working group of the IETF which is the standardizing organization for the Internet (see, IETF RFC 2002, IP mobility support (C. Perkins)).

Now, in the mobile IP scheme, when the mobile computer moves to a new visited site, there is a need to send a current location registration message to the home agent. Here, an authentication code according to a security information exchanged between the mobile computer and the home agent in advance is attached to the location registration message in order to avoid an attack such as pretending of the mobile computer. The location registration of the mobile computer will not take place if the registration message is not attached with the proper authentication code.

However, the security measure specified by the mobile IP is only the security in host (mobile computer) basis and does not authenticate an actual user who is using that mobile computer. Namely, if the host (mobile computer) itself is stolen by an improper user while the security information for the authentication between hosts is maintained within the host, it would be possible for the improper user to take out information on the home network by pretending the legitimate user so that it is very dangerous.

Also, even if it is not stolen, there is a possibility for the improper user to take out the secret information on the home network by just temporarily borrowing the mobile computer at which the registration processing is already carried out by the legitimate user.

In other words, the security measure in the conventional mobile IP scheme is capable of coping with the pretending attack in host basis, but quite vulnerable to the attack of an improper user pretending a legitimate user. For this reason, there has been possibilities for having the secret information on the internal network improperly taken out to a visited site (external network).

On the other hand, if the mobile computer is stolen, the home network information (such as an IP address of the home agent, its authentication key, addresses of a default router and internal hosts, for example) that is registered in that mobile computer will also be stolen together, so that various types of attacks might be induced based on such a stolen information. Thus, such an information from which the internal network information can be guessed should preferably be not maintained on the mobile computer as much as possible from a viewpoint of security, in order to prevent a security-wise very dangerous situation of having the mobile computer stolen together with the internal network information registered thereon.

SUMMARY OF THE INVENTION

It is therefore an object of the present invention to provide a mobile IP communication scheme capable of authenticating an individual user who is operating the mobile computer when the mobile computer is connected to a visited site network and transmits a current location registration message to the home agent.

It is another object of the present invention to provide a mobile IP communication scheme capable of coping even with a case where the improper user uses the mobile computer after the session is established, by regularly carrying out the user authentication even after the mobile computer once transmitted the current location registration message to the home agent.

It is another object of the present invention to provide a mobile IP communication scheme capable of preventing an improper acquisition of the user information or the network information used at the mobile computer, or an invasion into the home network through an improper use of the mobile computer.

Specifically, the present invention provides a mobile computer management device, a mobile computer device a communication system and a mobile computer registration method for realizing such a mobile IP communication scheme.

According to one aspect of the present invention there is provided a mobile computer management device located in a home network of a mobile computer for enabling the mobile computer to carry out communications while moving over inter-connected networks, the mobile computer management device comprising: a registration unit for registering an information on a current location of the mobile computer, based on a registration message transmitted from the mobile computer, which is currently located outside the home network; a transfer unit for transferring packets destined to the mobile computer to the current location of the mobile computer according to the information registered by the registration unit; and a user authentication unit for carrying out a user authentication, prior to a registration of the information on the current location of the mobile computer, to judge a properness of a user of the mobile computer according to a user-input-based information received from the mobile computer, and controlling the registration of the information by the registration unit according to a result of the user authentication.

According to another aspect of the present invention there is provided a mobile computer device capable of carrying out communications while moving over inter-connected networks, the mobile computer device comprising: a registration message transmission unit for transmitting a registration message containing an information on a current location of the mobile computer device, from outside a home network of the mobile computer device to a mobile computer management device located at the home network, the mobile computer management device having a function for managing the information on the current location of the mobile computer device and transferring packets destined to the mobile computer device to the current location of the mobile computer device; a user input unit for accepting a user input for user authentication; and a user-input-based information transmission unit for transmitting to the mobile computer management device a response message containing information based on the user input as a user authentication information, when a challenge message that requests returning of the user authentication information is received from the mobile computer management device in response to the registration message.

According to another aspect of the present invention there is provided a mobile computer device capable of carrying out communications while moving over inter-connected networks, the mobile computer device comprising: an external interface unit for reading out desired information from an external memory device connected to the mobile computer device, wherein the external memory device stores at least a user information and a network information to be used for communications at a visited site; a user authentication unit for carrying out first user authentication locally at the mobile computer device according to the user information stored in the external memory device and a user input; a registration message transmission unit for transmitting a registration message containing an information on a current location of the mobile computer device, from outside a home network of the mobile computer device to a mobile computer management device located at the home network, by using the network information read out from the external memory device under a control by the user authentication unit, the mobile computer management device having a function for managing the information on the current location of the mobile computer device and transferring packets destined to the mobile computer device to the current location of the mobile computer device; and a user-input-based information transmission unit for transmitting to the mobile computer management device a user-input-based information to be used for second user authentication at the mobile computer management device.

According to another aspect of the present invention there is provided a method for registering a mobile computer in a mobile computer management device for enabling the mobile computer to carry out communications while moving over inter-connected networks, the mobile computer management device having a function for managing information on a current location of the mobile computer device and transferring packets destined to the mobile computer device to the current location of the mobile computer device, the method comprising the steps of: transmitting a registration message containing the information on the current location of the mobile computer from the mobile computer at a visited site to a mobile computer management device at a home network of the mobile computer: carrying out a user authentication to judge a properness of a user of the mobile computer according to a user-input-based information; and registering the current location of the mobile computer at the mobile computer management device when the user is judged as a proper user.

According to another aspect of the present invention there is provided an article of manufacture, comprising: a computer usable medium having computer readable program code means embodied therein for causing a computer to function as a mobile computer management device located in a home network of a mobile computer for enabling the mobile computer to carry out communications while moving over inter-connected networks, the computer readable program code means includes: first computer readable program code means for causing said computer to register an information on a current location of the mobile computer, based on a registration message transmitted from the mobile computer, which is currently located outside the home network; second computer readable program code means for causing said computer to transfer packets destined to the mobile computer to the current location of the mobile computer according to the information registered by the first computer readable program code means; and third computer readable program code means for causing said computer to carry out a user authentication, prior to a registration of the information on the current location of the mobile computer, to judge a properness of a user of the mobile computer according to a user-input-based information received from the mobile computer, and controlling the registration of the information by the first computer readable program code means according to a result of the user authentication.

According to another aspect of the present invention there is provided an article of manufacture, comprising: a computer usable medium having computer readable program code means embodied therein for causing a computer to function as a mobile computer capable, of carrying out communications while moving over inter-connected networks, the computer readable program code means includes: first computer readable program code means for causing said computer to transmit a registration message containing an information on a current location of the mobile computer, from outside a home network of the mobile computer to a mobile computer management device located at the home network, the mobile computer management device having a function for managing the information on the current location of the mobile computer and transferring packets destined to the mobile computer to the current location of the mobile computer; and second computer readable program code means for causing said computer to accept a user input for user authentication; and third computer readable program code means for causing said computer to transmit to the mobile computer management device a response message containing information based on the user input as a user authentication information, when a challenge message that requests returning of the user authentication information is received from the mobile computer management device in response to the registration message.

According to another aspect of the present invention there is provided an article of manufacture, comprising: a computer usable medium having computer readable program code means embodied therein for causing a computer to function as a mobile computer device capable of carrying out communications while moving over inter-connected networks, the computer readable program code means includes: first computer readable program code means for causing said computer to read out desired information from an external memory device connected to the mobile computer device, wherein the external memory device stores at least a user information and a network information to be used for communications at a visited site; second computer readable program code means for causing said computer to carry out first user authentication locally at the mobile computer device according to the user information stored in the external memory device and a user input; third computer readable program code means for causing said computer to transmit a registration message containing an information on a current location of the mobile computer device, from outside a home network of the mobile computer device to a mobile computer management device located at the home network, by using the network information read out from the external memory device under a control by the second computer readable program code means, the mobile computer management device having a function for managing the information on the current location of the mobile computer device and transferring packets destined to the mobile computer device to the current location of the mobile computer device; and fourth computer readable program code means for causing said computer to transmit to the mobile computer management device a user-input-based information to be used for second user authentication at the mobile computer management device.

Other features and advantages of the present invention will become apparent from the following description taken in conjunction with the accompanying drawings.

BRIEF DESCRIPTION OF THE DRAWINGS

FIG. 7 is a sequence chart for a user authentication using one-time password according to the first embodiment of the present invention.

FIGS. 8A and 8B are diagrams showing exemplary formats of challenge and response messages used in the processing of FIG. 7.

DETAILED DESCRIPTION OF THE PREFERRED EMBODIMENTS

Referring now to FIG. 1 to FIG. 15, the first embodiment of a mobile IP communication scheme according to the present invention will be described in detail.

Figure 1:
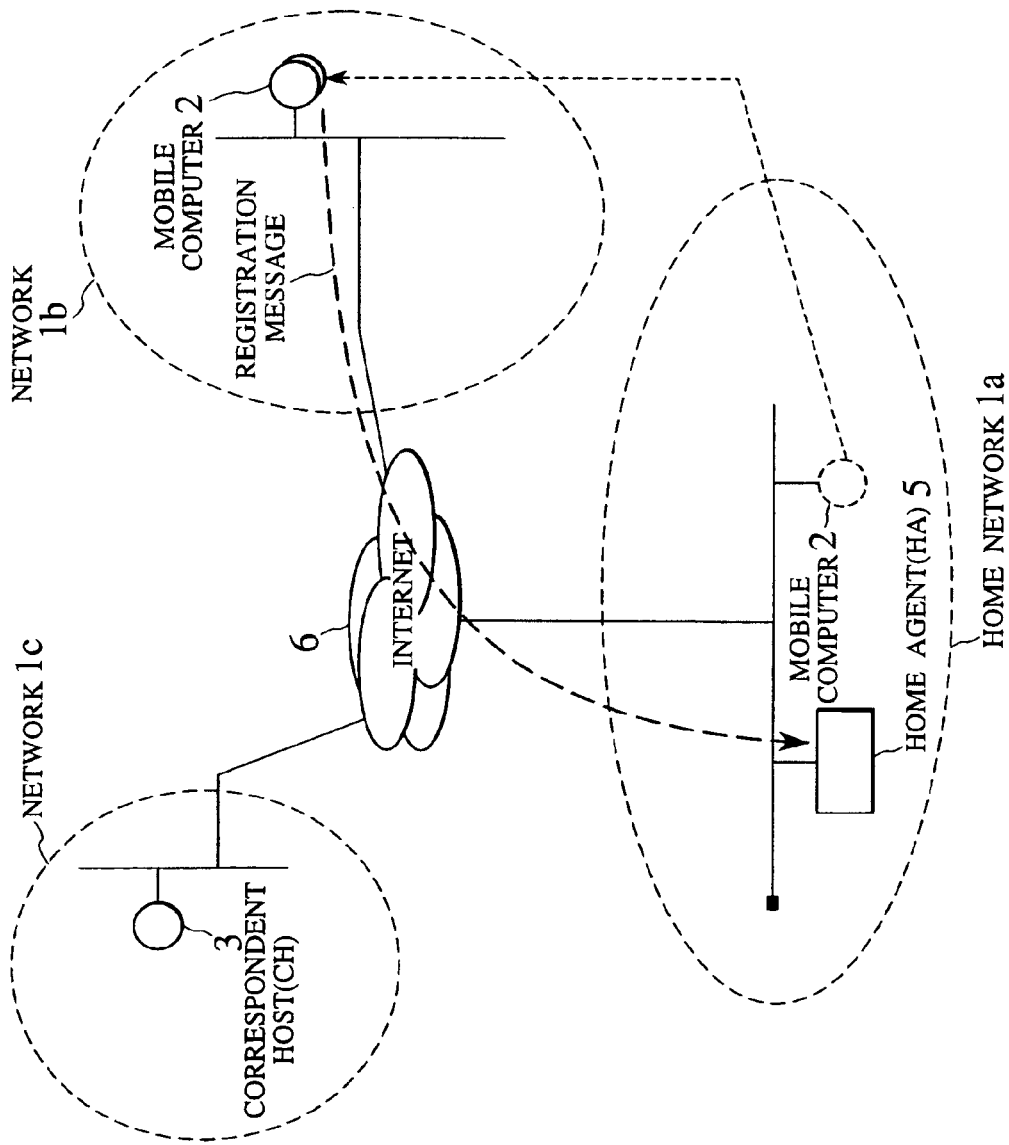
FIG. 1 is a schematic diagram showing an exemplary basic configuration of a communication system according to the present invention.

FIG. 1 shows an exemplary basic configuration of a communication system according to the first embodiment. This communication system of FIG. 1 is assumed to be supporting communications of a mobile computer according to the mobile IP (RFC 2002). Note that the mobile IP protocol has two modes including a mode that assumes an existence of a router called foreign agent for carrying out a packet delivery with respect to the mobile computer at a visited site network and a Co-located Care-of address mode in which no foreign agent is provided (the mobile computer itself plays the role of a foreign agent), and the following description will be given for an exemplary case of adopting the latter mode.

In FIG. 1, a home network 1a, a first other section network 1b and a second other section network 1c are inter-connected through the Internet 6, while a mobile computer (MN) 2 and its correspondent host (CH) 3 are connected within these networks, or connected to the Internet 6 as external nodes.

In this first embodiment, the case where the mobile computer 2 having its home position within the network 1a has moved to the other section network 1b will be described.

The home network 1a is provided with a home agent (HA) 5 for managing an information on a current location at the visited site of the mobile computer in order to support the mobile IP protocol. Here, the number of mobile computers to be managed by one home agent is arbitrary. As described above, a transferred IP packet destined to the mobile computer 2 on move is captured by the home agent 5 at the home network, where the routing control for data with respect to the mobile computer 2 can be realized by encapsulating an IP packet destined to an original address (an address in the home network 1a) of the mobile computer 2 within a packet in the mobile IP format which is destined to the current location address.

When the mobile computer 2 moves outside its own home network, the mobile computer 2 acquires an address to be used at a visited site network using a protocol such as DHCP (Dynamic Host Configuration Protocol) or PPP (Point-to-Point Protocol) at the visited site network (1b in this example). When the address is acquired, the mobile computer 2 transmits a registration message containing a current location information to the home agent 5 in the home network 1a.

Figure 2:
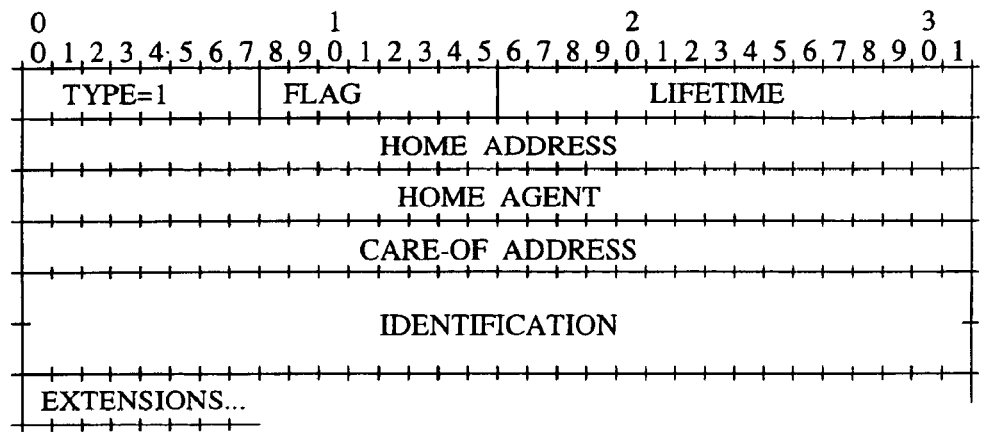
FIG. 2 is a diagram showing an exemplary format of a registration message that can be used in the present invention.

FIG. 2 shows an exemplary format of the registration message to be transmitted from the mobile computer 2 to the home agent 5, which includes the following fields.

"FLAG" indicates an operation mode (such as an encapsulation method) of the mobile IP.

"Lifetime" indicates a valid period of this registration. When the valid period is over, the mobile computer 2 must carry out the re-registration by transmitting the registration message to the home agent 5 again.

"Home Address" indicates a home location of the mobile computer, "Care-of Address" Indicates a current location of the mobile computer 2, and "Home Agent" indicates an address of the home agent 5.

"Identification" indicates an ID given to the registration, which is added in order to prevent a replay attack.

Figure 3:
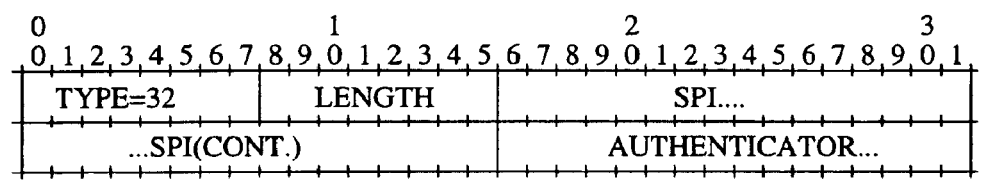
FIG. 3 is a diagram showing a detail of an "Extensions" field in the format of FIG. 2 that can be used in the first embodiment of the present invention.

"Extensions" contains at least an authentication information (for the host authentication) used between the mobile computer 2 and the home agent 5. A detail of this "Extensions" field is shown in FIG. 3, where "SPI" indicates a security parameter index exchanged between the mobile computer 2 and the home agent 5, and "Authenticator" indicates the authentication code.

Figure 4:
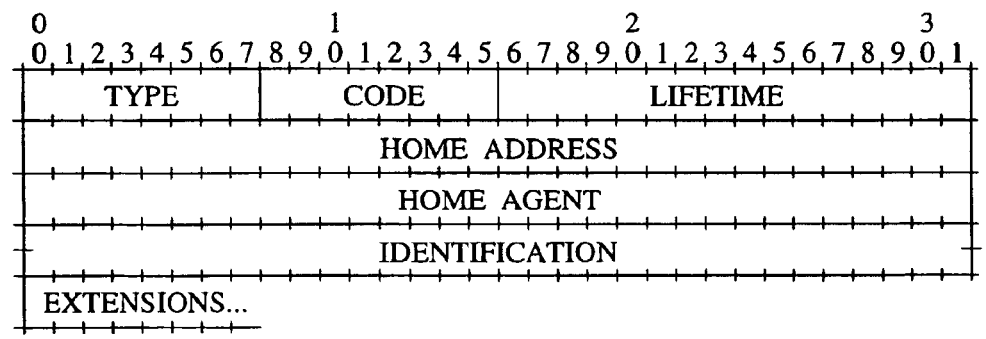
FIG. 4 is a diagram showing an exemplary format of a registration reply message that can be used in the first embodiment of the present invention.

When this registration message is received by the home agent 5 and the registration processing is properly carried out, a registration reply message as shown in FIG. 4 is returned to the mobile computer 2, where "Code" describes a reply code 0 or 1 indicating the registration success. On the other hand, when the registration fails, the registration reply message in the same format as that of FIG. 4 is returned to the mobile computer 2, where reply codes indicating various reasons for the registration failure are described. In the following, the exemplary list of reply codes that can be used here will be illustrated, where the number on a left side of a colon is a code and the description on a right side of a colon is the content indicated by the code on the left side.

Case of Success
   0: registration accepted
   1: registration accepted, but simultaneous mobility bindings unsupported
Case of Failure for Foreign Agent
   64; reason unspecified
   65: administratively prohibited
   66: insufficient resources
   67: mobile node failed authentication
   68: home agent failed authentication
   69: requested Lifetime too long
   70: poorly formed Request
   71: poorly formed Reply
   72: requested encapsulation unavailable
   73: requested Van Jacobson compression unavailable
   80: home network unreachable (ICMP error received)
   81: home agent host unreachable (ICMP error received)
   82: home agent port unreachable (ICMP error received)
   88: home agent unreachable (ICMP error received)
Case of Failure for Home Agent
   128: reason unspecified
   129: administratively prohibited
   130: insufficient resources
   131: mobile node failed authentication
   132: foreign agent failed authentication
   133: registration Identification mismatch
   134: poorly formed Request
   135: too many simultaneous mobility bindings
   136: unknown home agent address)

Now, in this first embodiment, when the home agent 5 receives the registration message from the mobile computer 2, the registration processing is not carried out immediately, and the user authentication for the mobile computer 2 is carried out first, and the registration processing is carried out only when the user authentication succeeded.

Figure 5:
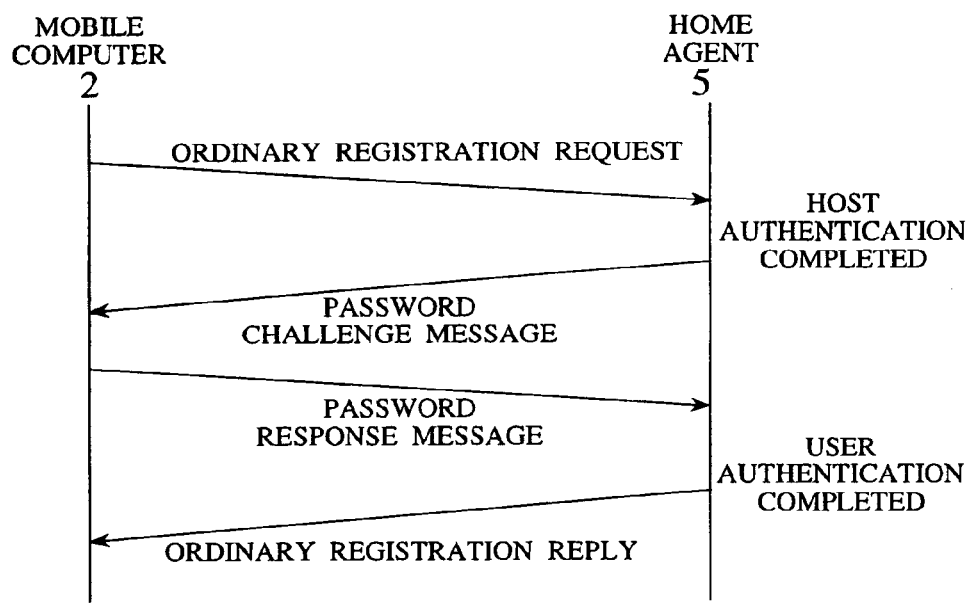
FIG. 5 is a sequence chart for a user authentication using challenge and response messages according to the first embodiment of the present invention.

Here, in an exemplary case of exchanging challenge and response messages in order for the home agent 5 to authenticate the user who is using the mobile computer 2, the processing according to the sequence chart of FIG. 5 is carried out as follows.

Figure 6A:
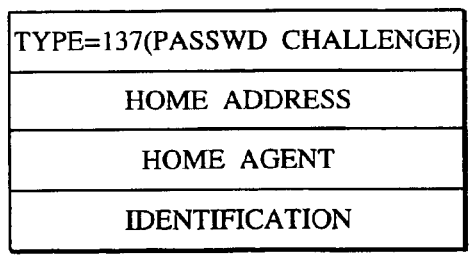
FIGS. 6A and 6B are diagrams showing exemplary formats of challenge and response messages used in the processing of FIG. 5.
Figure 6B:
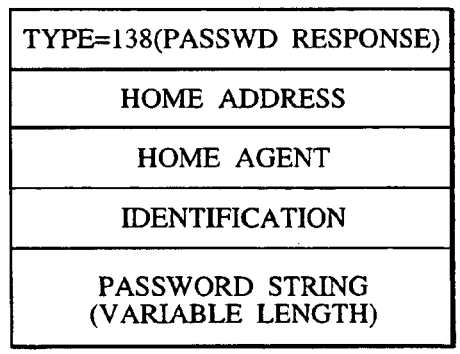

FIG. 6A shows a format of a challenge message and FIG. 6B shows a format of a response message used in this processing.

In this example, when the mobile computer 2 transmits the registration request message to the home agent 5, the home agent 5 checks the authentication information and carries out the host authentication first. Then, when the host authentication succeeds, the home agent 5 returns the challenge message for requesting a password input to the mobile computer 2.

When this challenge message is received, the mobile computer 2 urges the password input to the user by displaying a message for example. Then, when the password is entered, the response message containing the password entered by the user is transmitted to the home agent 5.

When the response message is received, the home agent 5 carries out the comparison with the password that is registered in advance in correspondence to the mobile computer 2 while the mobile computer 2 was located at the home network. As a result of this comparison, if it is confirmed that the password returned from the mobile computer 2 is the proper one, it is judged that the registration of the current location is to be permitted so that the registration reply message containing a reply code indicating the registration success is returned while the current location is registered and the transfer of data packets to the mobile computer 2 is started.

By carrying out the password authentication at the home agent 5 side in this manner, it becomes unnecessary to maintain the information for the user authentication in the mobile computer 2 and carry it around, so that it is possible to avoid a risk associated with the stealing of the mobile computer 2. Also, it becomes possible for a manager of the entire system to carry out the centralized management at the home agent 5 even for the password used by the mobile computer on move, so that it becomes easier to cope with an abnormal situation such as that of the improper use of the computer, and it becomes possible to realize the safer system operation.

In addition, at the home agent 5 side, the authentication as to whether the host that has transmitted the registration message of the mobile IP is a legitimate host or not and the authentication as to whether the user who is trying to carry out the mobile IP communications is a legitimate user or not can be carried out independent, so that it is possible to permit the mobile IP communications with respect to arbitrary combination of user and host (mobile computer). Namely, a system where the user authentication is carried out between the user and the host rather than the home agent while the host authentication is carried out between the host and the home agent, the authentication would be possible for a fixed combination of user and host alone, whereas in this embodiment, it is possible to realize a more flexible management.

As for the subsequent re-registration messages, there are various methods for handling the subsequent re-registration messages, including a method which carries out the user authentication every time by the same procedure, a method which carries out the user authentication once in every prescribed number of times, and a method which does not carry out the user authentication, for example.

Note that, in the above, the password is returned from the mobile computer 2 to the home agent 5, but it is also possible to return a set of the password and the user ID such that the home agent 5 judges the legitimacy of the user by checking whether this set coincides with that registered in advance or not.

Note also that the above is directed to an exemplary procedure in which the host authentication is carried out in response to the registration request from the mobile computer 2 to the home agent 5 first, and then the user authentication is carried out only after a message urging the password transmission is returned from the home agent 5 to the mobile computer 2, but it is also possible to carry out the host authentication and the user authentication in a single step by including the password in the registration request initially transmitted from the mobile computer 2.

Note however that, by using separate steps for the host authentication based on the registration request and the user authentication based on the password transmission, or by sending the user name and the password separately at a time of the user authentication, it is possible to realize the management based on an even stronger security. The latter case adopts a scheme where the user name is sent first, and upon receiving this the home agent 5 returns the challenge message for a one-time password according to the initial data registered in correspondence to each user in advance, and then the normal registration is carried out when the user returns the response message in response, for example. On the other hand, in the former case, when the reply message from the home agent in response to the registration request is received, the mobile computer can transmit the user authentication information (password) after checking whether the correspondent host is the proper home agent or not.

In practice, whether to process the registration request and the user authentication information as one set, whether to process the user name and the password as one set, or whether to handle these as separate messages, should be determined according to the required specification regarding the system security and the required specification regarding the user interface on the mobile computer side.

Note also that the above is directed to an exemplary case of the user authentication using a simple password matching, but the other methods of the user authentication may be used instead. For example, it is possible to adopt the user authentication using a one-time password.

In the case of the user authentication using a one-time password, the processing according to the sequence chart of FIG. 7 is carried out as follows.

FIG. 8A shows a format of a challenge message and FIG. 8B shows a format of a response message used in this processing.

In this example, when the mobile computer 2 transmits the registration request message to the home agent 5, the home agent 5 checks the authentication information and carries out the host authentication first. Then, when the host authentication succeeds, the home agent 5 obtains a challenge code of a one-time password according to the registration information of the user who uses this mobile computer 2. Then, the challenge message with this challenge code attached thereto for requesting a password input is returned to the mobile computer 2.

When this challenge message is received, the mobile computer 2 utilizes another utility to calculate a response data with respect to this challenge which reflects the one-time password challenge code within this challenge message and the password entered by the user, and transmits the response message containing this response data to the home agent 5.

When the response message is received, the home agent 5 carries out the same calculation as done by the mobile computer 2 according to the registration information and then carries out the data matching, and if it is the proper one, it is judged that the registration of the current location is to be permitted so that the registration reply message containing a reply code indicating the registration success is returned while the current location is registered and the transfer of data packets to the mobile computer 2 is started.

As for the subsequent re-registration messages, there are various methods for handling the subsequent re-registration messages, including a method which carries out the user authentication every time by the same procedure, a method which carries out the user authentication once in every prescribed number of times, and a method which does not carry out the user authentication, for example.

Note here that, in each example described above, it is also possible to return the registration reply message containing a code indicating the user authentication failure to the mobile computer immediately when the user authentication fails. Else, it is also possible to return the registration reply message containing a code indicating the user authentication failure to the mobile computer after repeating the exchange of the challenge message and the response message for a prescribed number of times and the user authentication still fails.

Now, the two examples described above are directed to the user authentication at a timing where the mobile computer 2 is connected to the visited site network and starts the registration processing, but it is preferable in practice to cope also with the case where the improper user improperly uses the mobile computer 2 after the completion of the registration in order to leak the information inside the home network, such as the case where the legitimate user temporarily leaves the mobile computer 2 without turning it off and the improper user uses the mobile computer 2 while the legitimate user is absent.

In order to cope with such cases, it is possible to transmit a user authentication request message from the home agent 5 to the mobile computer 2 at regular intervals, even after the registration processing was successfully completed once. In this case, the home agent 5 is supplemented with a function configuration as shown in FIG. 9, and the processing according to the flow chart shown in FIG. 10 is carried out as follows.

Figure 9:
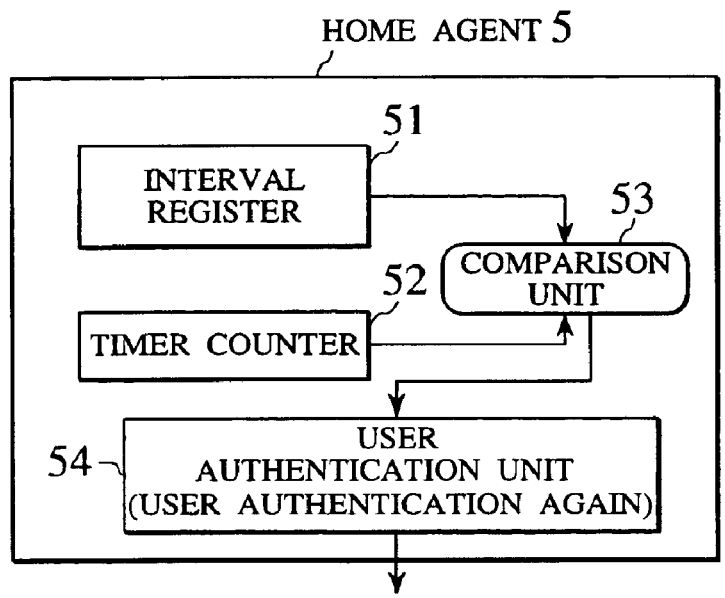
FIG. 9 is a schematic block diagram showing a supplemental functional configuration for a home agent that can be used in the first embodiment of the present invention.
Figure 10:
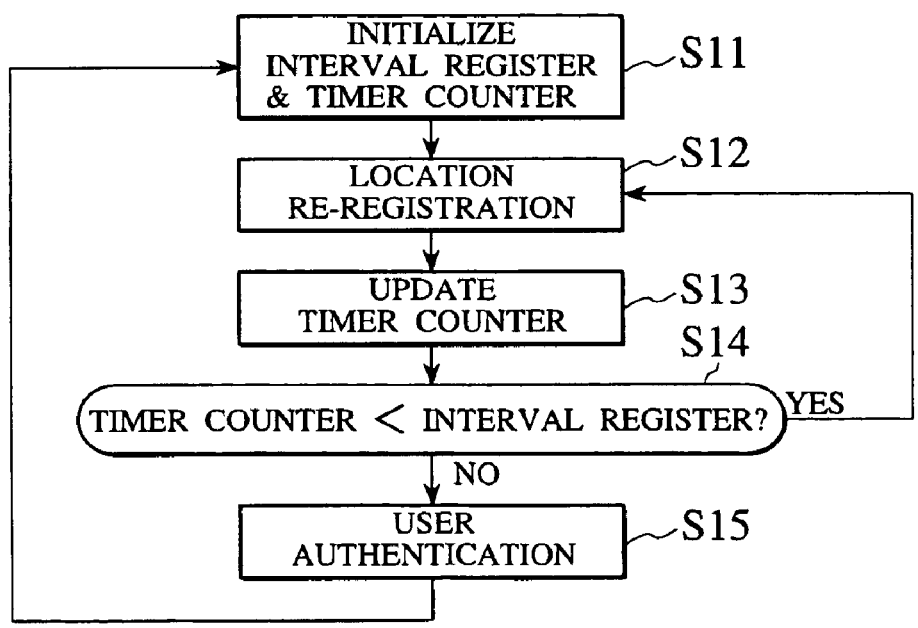
FIG. 10 is a flow chart for an operation by the supplemental functional configuration of FIG. 9.

In the home agent 5 having the functional configuration of FIG. 9, the user re-authentication interval time specified by the user (or the system manager) in advance is entered in an interval register 51, and a timer counter 52 is initialized to 0 (step S11). Also, when the user authentication sequence is executed for some mobile computer 2 (step S15), the timer counter 52 corresponding to that mobile computer 2 is cleared to 0 at the step S11. Note that the initial user authentication sequence is executed when the first registration message after moving is received for some mobile computer, as in the case of FIG. 5 or FIG. 7, for example.

Then, upon receiving the current location re-registration message from the mobile computer, the location re-registration is carried out (step S12), and the corresponding timer counter 52 is updated to the elapsed time (step S13).

Also, at a time of the location re-registration, the interval time registered in the interval register 51 and the counter value of the corresponding timer counter 52 are compared at a comparison unit 53 (step S14), and when the counter value of the timer counter 52 is smaller than the interval time (step S14 YES), the re-registration of the current location and the registration success message transmission are carried out without the user authentication.

On the other hand, when the counter value of the timer counter 52 reaches to the interval time (step S14 NO), the user authentication such as that of FIG. 5 or FIG. 7 is executed again at a user authentication unit 54 (step S15). When the user authentication is successfully carried out, it is judged that the re-registration of the current location is to be permitted so that the registration reply message containing a reply code for the registration success is returned while the re-registration of the current location is carried out and the transfer of data packets to the mobile computer 2 is continued. Then, the corresponding timer counter 52 is cleared to 0 again.

Subsequently, a series of operations including the repetitions of the location re-registration without the ID user authentication and the timer counter updating, and the user authentication whenever a prescribed period of time has elapsed and the location re-registration when the user authentication succeeds, will be repeated until the valid period of the current location expires, or the user authentication fails, or the location registration fails.

Also, as already mentioned above, it is possible to return the registration reply message containing a code indicating the user authentication failure to the mobile computer immediately when the user authentication fails. Else, it is also possible to return the registration reply message containing a code indicating the user authentication failure to the mobile computer after repeating the exchange of the challenge message and the response message for a prescribed number of times and the user authentication still fails.

Note also that, in the above, an exemplary case of carrying out the user authentication whenever a prescribed period of time elapses has been described, but it is possible to carry out the user authentication whenever the re-registration message is received, and it is also possible to carry out the user authentication once after receiving a prescribed number of re-registration messages.

Now, in the case where the mobile computer 2 is stolen and the improper user tries to make the registration request from outside the home network, for example, as long as the user authentication such as that of FIG. 5, FIG. 7 or FIG. 10 is used, the current location cannot be registered and therefore the improper use cannot be made (because it is extremely difficult to successfully complete the user authentication in the ordinary way). However, there is still a possibility for having the traffic of the home network jammed as the improper user repeatedly carries out the transmission and reception of the registration and user authentication messages in an attempt to break the password in the exhaustive trials and errors fashion such that it becomes difficult to operate the system normally. There is also a possibility for receiving a password guessing attach using dictionaries and the like from the improper user.

In order to cope with these possibilities, it is possible to make the mobile computer 2 such that it becomes impossible to transmit the message from the mobile computer 2 after the user authentication failure is repeated for a prescribed number of times. In this case, the mobile computer 2 is supplemented with a function configuration as shown in FIG. 11, and the processing according to the flow chart shown in FIG. 12 is carried out as follows.

Figure 11:
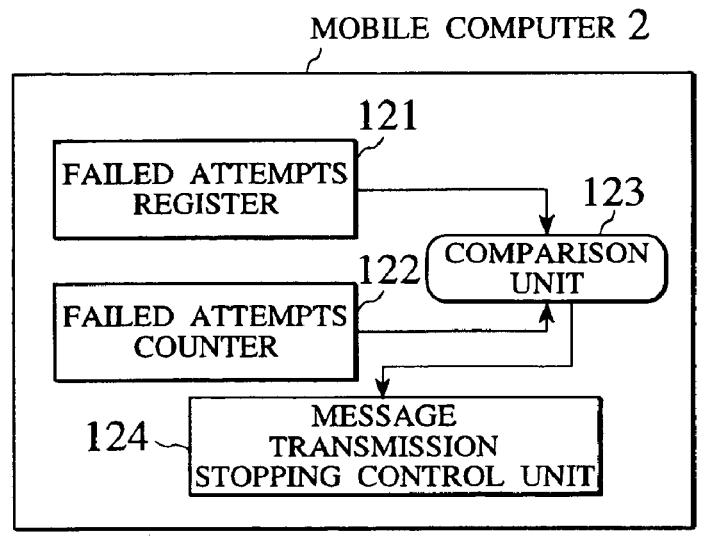
FIG. 11 is a schematic block diagram showing a supplemental functional configuration for a mobile computer that can be used in the first embodiment of the present invention.
Figure 12:
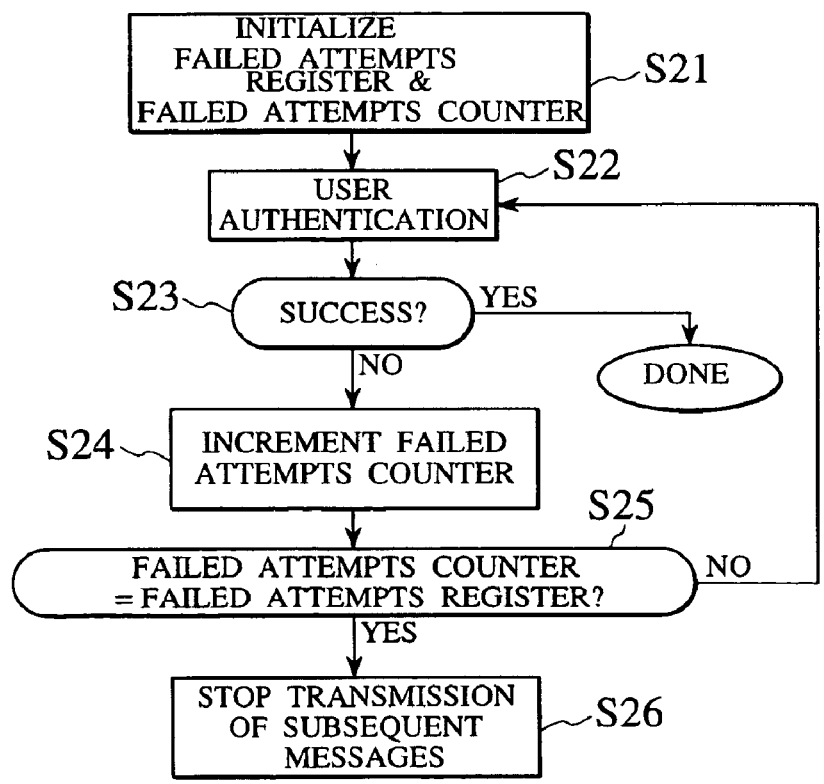
FIG. 12 is a flow chart for an operation by the supplemental functional configuration of FIG. 11.

In the mobile computer 2 having the functional configuration of FIG. 11, the consecutive user authentication failure attempts number specified by the user (or the system manager) in advance is entered in a failed attempts register 121, and a failed attempts counter 122 is initialized to 0 (step S21).

Then, whenever the user authentication is attempted (step S22) and the user authentication is not successful as a message indicating the user authentication failure is received from the home agent 5 (step S23 NO), the failed attempts counter 122 is incremented by one (step S24). On the other hand, when the user authentication is successful (step S23 YES), the failed attempts counter 122 is reset to 0.

Then, the value of the failed attempts register 121 and the value of the failed attempts counter 122 are compared at a comparison unit 123 (step S25), and when they coincide (step S25 YES), the mobile computer 2 activates a message transmission stopping control unit 124 so as to stop all subsequent message transmissions (step S26). Here, it is assumed that the use of a unique information of this mobile computer 2 that is stored in the home agent is necessary in releasing the message transmission stopping by the message transmission stopping control unit 124.

Now, in the above, the message transmission stopping function is provided in the mobile computer, but alternatively, it is also possible to make the home agent 5 such that the registration is refused for any subsequent registration messages after the user authentication failure is repeated for a prescribed number of times. In this case, the home agent 5 is supplemented with a function configuration as shown in FIG. 13, and the processing according to the flow chart shown in FIG. 14 is carried out as follows.

Figure 13:
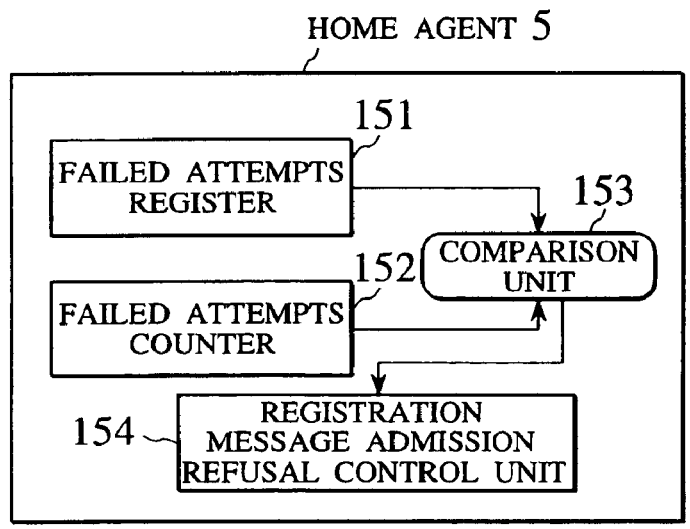
FIG. 13 is a schematic block diagram showing another supplemental functional configuration for a home agent that can be used in the first embodiment of the present invention.
Figure 14:
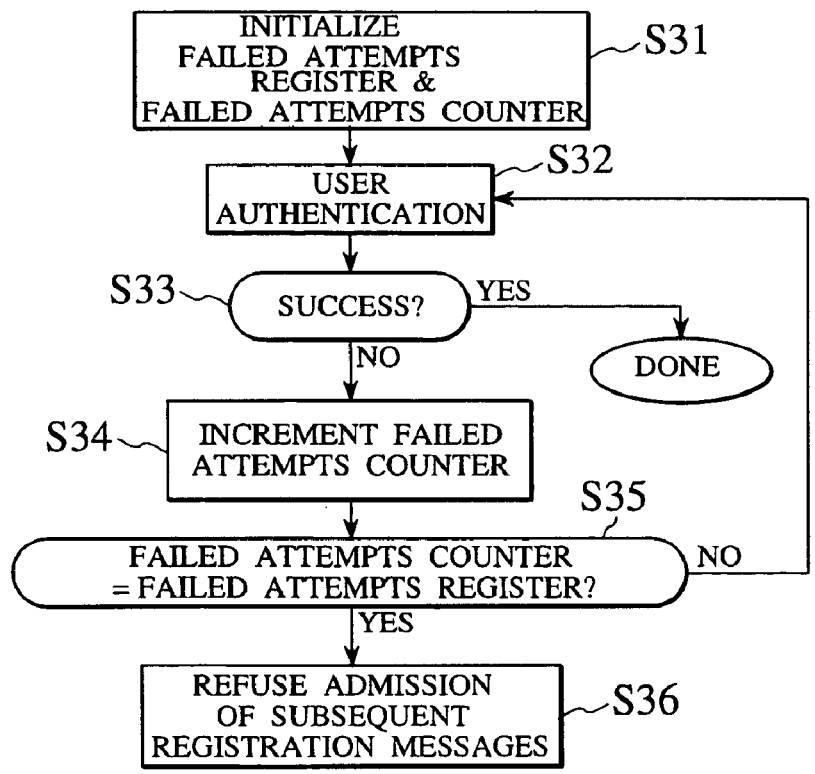
FIG. 14 is a flow chart for an operation by the supplemental functional configuration of FIG. 13.

In the home agent 5 having the functional configuration of FIG. 13, the consecutive user authentication failure attempts number specified by the user (or the system manager) in advance is entered in a failed attempts register 151 corresponding to each mobile computer, and a failed attempts counter 152 corresponding to each mobile computer is initialized to 0 (step S31).

Then, whenever the user authentication is attempted (step S32) and the user authentication is not successful (step S33 NO), the corresponding failed attempts counter 152 is incremented by one (step S34). On the other hand, when the user authentication is successful (step S33 YES), the failed attempts counter 152 is reset to 0.

Then, the value of the failed attempts register 151 and the value of the failed attempts counter 152 are compared at a comparison unit 153 (step S35), and when they coincide (step S35 YES), the home agent 5 activates a registration message admission refusal control unit 154 so as to refuse admission of all subsequent registration messages from that mobile computer 2 (step S36). Here, it is assumed that the use of a unique information of this mobile computer 2 that is stored in the home agent is necessary in releasing the message transmission stopping by the message transmission stopping control unit 124.

Note that, in this scheme, the security standard can be considered rather low compared with the scheme of FIG. 11 and FIG. 12 in that it cannot prevent unnecessary message exchanges, but it can still be utilized effectively by selecting either a scheme of FIG. 11 or a scheme of FIG. 13 depending on the policy and the like at the site, for example.

It is also possible to modify the two schemes described above in such a manner that the occurrence of the consecutive user authentication failures for a prescribed number of times is detected at the mobile computer 2 side and notified from the mobile computer 2 to the home agent 5, and then the home agent 5 refuses the admission of all subsequent registration messages from that mobile computer 2.

In the examples described above, it is also possible to delete the registration of the mobile computer 2 at a timing where the occurrence of the consecutive user authentication failures for a prescribed number of times is detected. Else, it is also possible to support the packet transfer for the mobile computer 2 until the valid period expires.

Figure 15:
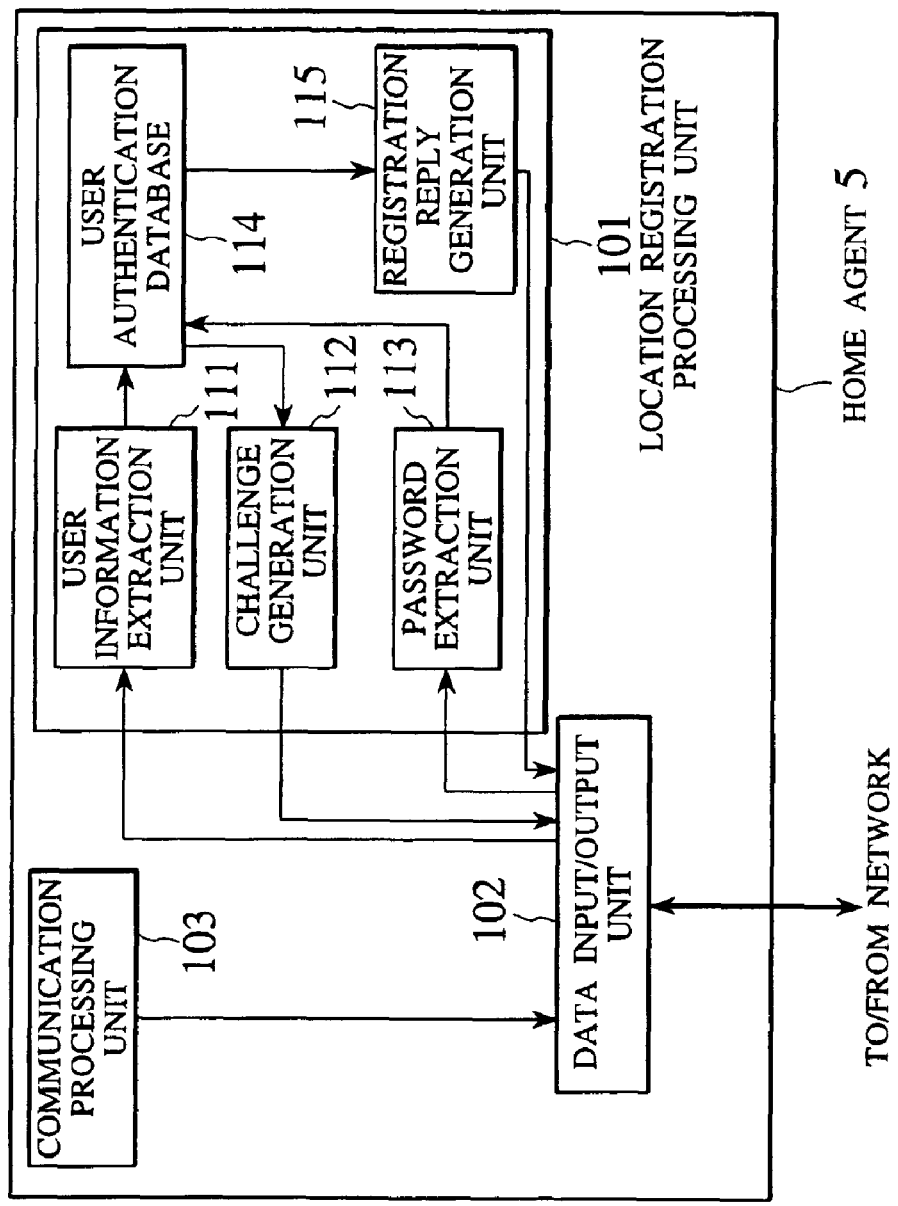
FIG. 15 is a block diagram showing an exemplary internal configuration of a home agent according to the first embodiment of the present invention.

FIG. 15 shows an exemplary internal configuration of the home agent 5 that can be used in this first embodiment, which generally comprises a location registration processing unit 101, a data input/output unit 102, and a communication processing unit 103. The packets are transmitted and received to and from the network at the data input/output unit 102 and those packets for the location registration are given to the location registration processing unit 101 while the other packets are given to the communication processing unit 103.

The location registration processing unit 101 includes a user information extraction unit 111 for extracting the user information from the received registration request message and storing it into a user authentication database 114, a challenge generation unit 112 for generating the challenge message according to the information stored in the user authentication database 114, a password extraction unit 113 for extracting the password from the received response message and storing it into the user authentication database, and a registration reply generation unit 115 for generating the registration reply message according to the information stored in the user authentication database 114.

As described, the security measure provided in the conventional mobile IP scheme is capable of coping with the pretending attack in host basis, but quite vulnerable to the attack of an improper user pretending a legitimate user. For this reason, there has been possibilities for having the secret information on the internal network improperly taken out to a visited site (external network).

In this regard, according to this first embodiment, when the mobile computer is connected to the visited site network and transmits the current location registration message to the home agent, the information that cannot possible be known by anyone other than the registered legitimate user is exchanged between the mobile computer and the home agent, so that it is possible to authenticate the user who is operating the mobile computer and therefore it is possible to operate the mobile computer more safely.

Also, according to this first embodiment, the user authentication is carried out regularly even after the mobile computer transmitted the current location registration message to the home agent once, so that it is possible to cope with the case where the improper user uses the mobile computer after the session is established. Also, when the authentication attempts by the improper user fails for a prescribed number of times, the subsequent registration message transmissions are stopped or the subsequent registration message admissions are refused, so that it is possible to prevent the improper operations involving the stealing of the mobile computer or the pretending of the legitimate user.

Referring now to FIG. 16 to FIG. 21, the second embodiment of a mobile IP communication scheme according to the present invention will be described in detail.

In this second embodiment, the basic configuration of a communication system is the same as that shown in FIG. 1 which is assumed to be supporting communications of a mobile computer according to the mobile IP (RFC 2002), and the following description will be given for an exemplary case of adopting the Co-located Care-of address mode. In the following, the case where the mobile computer 2 having its home position within the network 1a has moved to the other section network 1b will be described.

Figure 16:
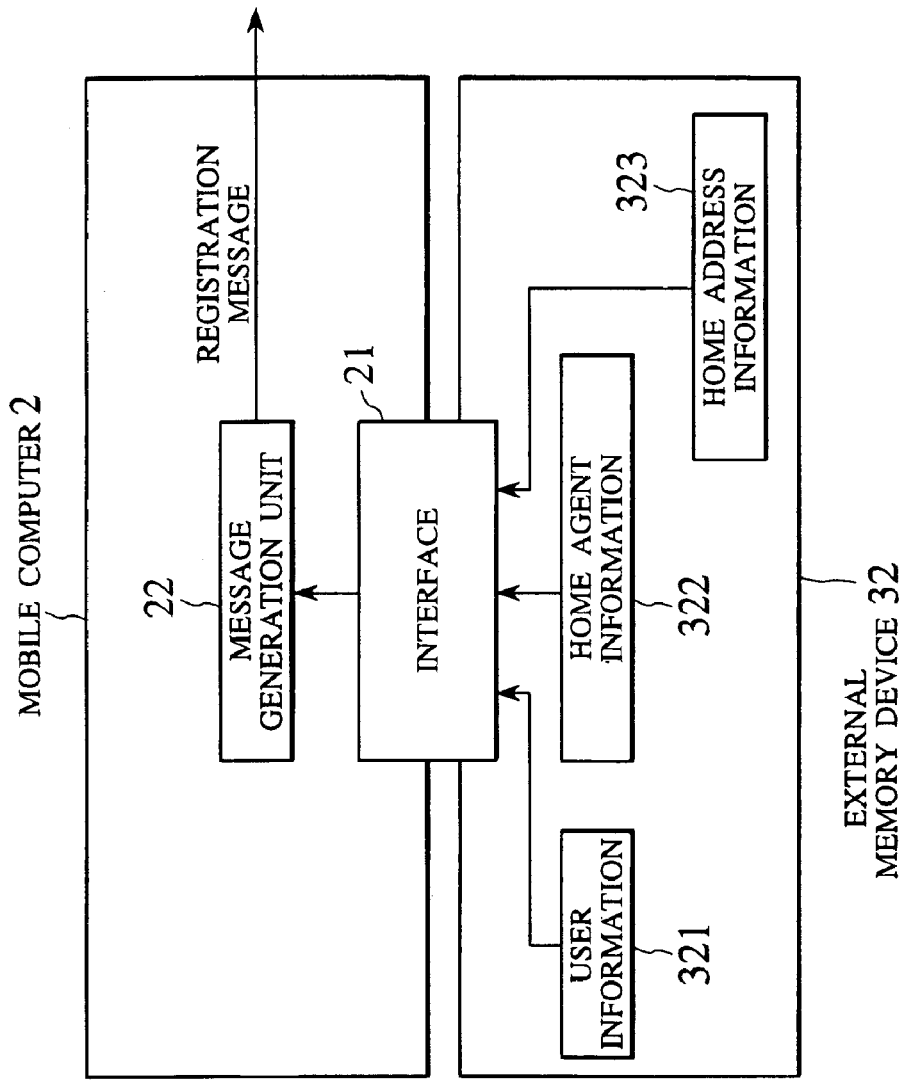
FIG. 16 is a block diagram showing an exemplary configuration of a mobile computer and an external memory device according to the second embodiment of the present invention.

FIG. 16 shows an exemplary schematic configuration of the mobile computer 2 in this second embodiment, where the information necessary for the mobile communications is maintained in an external memory device 32 rather than maintaining it within a body of the mobile computer 2. Here, the external memory device 32 is assumed to be maintaining a user information 321, a home agent information 322 and a home address information 323 therein. For this external memory device 32, a memory card can be used, for example.

The mobile computer 2 with the external memory device 32 connected thereto takes out the user information 321, the home agent information 322 and the home address information 323 from the external memory device 32 through an interface 21 according to the need, and generates the registration message in the format shown in FIG. 2 according to these information at a message generation unit 22 and transmits it to the home agent 5. The similar operation is also carried out when the information stored in the external memory device 32 is necessary in the other data communications.

In this second embodiment, when the mobile computer 2 detects that the external memory device 32 is attached thereto (or when the mobile computer 2 with the external memory device 32 already attached thereto is activated, or when the specific communication program is activated), for example, the mobile computer 2 requests to the user an input of a password corresponding to the user personal information (user ID for example) contained in the user information 323 that is read out from the attached external memory device 32. On the other hand, the mobile computer 2 itself stores therein sets of the user personal information and the password (or the mobile computer 2 itself stores a single set of the user personal information and the password and the user sets the password in advance).

Then, the entered password is compared with the password corresponding to the user information 323 that is set inside the mobile computer 2, and if they match, the information stored in the external memory device 32 is loaded into prescribed storage devices such as disk and RAM provided in the mobile computer 2 either immediately or when the need arises, and utilized in carrying out communications. In this way, it is possible to prevent the improper use of the once lost external memory device 32 by the others, for example.

When the password authentication falls, a message for urging the password input to the user is presented again, and when the password input failure is consecutively made for a prescribed number of times (including once), all subsequent information reading from the external memory device 32 should preferably be locked out.

Note that the information loaded into the mobile computer 2 from the external memory device 32 should preferably be deleted from all the storage devices such as disk and RAM provided in the mobile computer 2 when the communication program which requires that information is finished, or when the external memory device 32 is detached from the mobile computer 2 at a time of deactivation of the mobile computer 2. Any suitable combination of the data deletion timing and the password input timing as described above may be used.

Note also that, in the above, the password authentication is used in controlling permission/refusal of the data reading from the external memory device 32, but instead of that, it is also possible to carry out the control such that the message transmission is permitted when the password authentication succeeds and the subsequent registration request message transmissions or all message transmissions from the mobile computer 2 are refused when the password authentication falls consecutively for a prescribed number of times.

It is also possible to provide another password to be used in controlling permission/refusal of the registration request transmissions, in addition to controlling permission/refusal of the data reading from the external memory device 32 according to the password authentication as described above.

Figure 17:
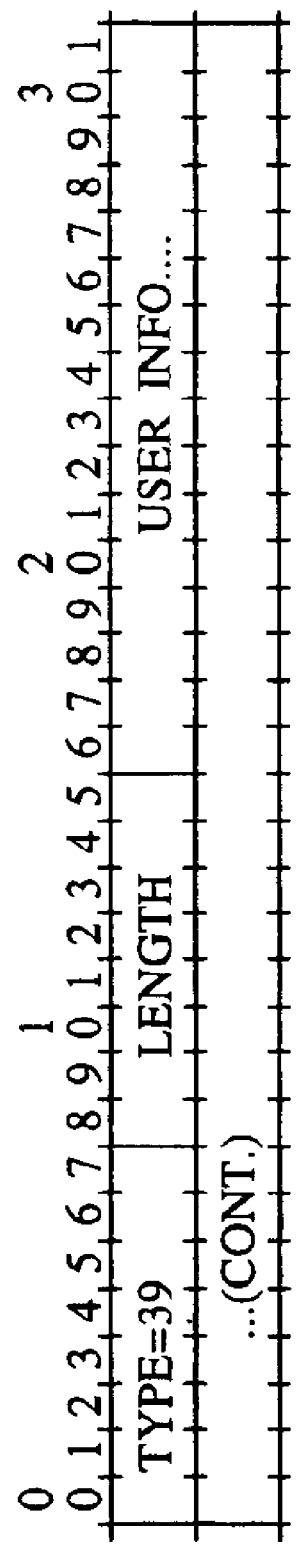
FIG. 17 is a diagram showing a detail of an "Extensions" field in the format of FIG. 2 that can be used in the first embodiment of the present invention.

Now, in order to make it possible to use the mobile computer 2 more safely, it is preferable to additionally provide a function for carrying out the user authentication between the mobile computer 2 and the home agent 5 at its home network. For the user authentication between the mobile computer 2 and the home agent 5, it is possible to use a scheme in which the information for the user authentication is included in the registration message when the mobile computer 2 transmits the registration message to the home agent 5. In this case, by incorporating a part or a whole of the user information 323 read out from the external memory device 32 into the "Extensions" field of the registration message shown in FIG. 2 in an appropriate format and transmitting such a registration message, it becomes possible to carry out the user authentication at the home agent 5 side. An exemplary data format for the user information (User info) to be included in this "Extensions" field is shown in FIG. 17.

When such a registration request message is transmitted from the mobile computer 2 to the home agent 5, the home agent 5 first checks the host authentication information and carries out the host information while checking the user information and carrying out the user authentication. Then, when both the host authentication and the user information succeed, the home agent 5 judges that the registration of the current location of the mobile computer 2 is to be permitted so that the registration reply message containing a reply code indicating the registration success is returned while the current location is registered and the transfer of data packets to the mobile computer 2 is started. Here, if at least one of the authentications fails, the registration failure message containing an information indicating the failure of the host authentication and/or the user authentication, for example, is returned to the mobile computer 2.

Now, in addition to the user authentication between the mobile computer 2 and the home agent 5 as described above, it is preferable to additionally provide the following function separately. Namely, considering the case where the mobile computer 2 is stolen, it is preferable to return the user password request from the home agent 5 so that the improper user cannot use it. In this case, it is possible to use a scheme in which, upon receiving the registration message from the mobile computer 2, the home agent 5 activates the execution of the user authentication procedure between the mobile computer 2 and the home agent 5 and carries out the registration processing if the user authentication was successful.

To this end, it is possible to use a scheme in which challenge and response messages are exchanged in order for the home agent 5 to authenticate the user who is using the mobile computer 2. In this case, the processing according to the sequence chart of FIG. 5 and formats of a challenge message and a response message as shown in FIG. 6A and FIG. 6B as described above can be used.

In this case, when the mobile computer 2 transmits the registration request message to the home agent 5, the home agent 5 checks the authentication information and carries out the host authentication first. Then, when the host authentication succeeds, the home agent 5 returns the challenge message to the mobile computer 2.

When this challenge message is received, the mobile computer 2 transmits the response message containing the authentication data entered by the user is transmitted to the home agent 5. Here, the authentication data can be a password for example. For this password, the same password as that used for the password authentication described above may be used or another password may be used.

When the response message is received, the home agent 5 carries out the comparison of the authentication data contained in the response message with the authentication data that is registered in advance in correspondence to the mobile computer 2 while the mobile computer 2 was located at the home network, so as to check whether the received authentication data is the proper one or not. As a result of this comparison, if it is confirmed that the authentication data returned from the mobile computer 2 is the proper one, it is judged that the registration of the current location is to be permitted so that the registration reply message containing a reply code indicating the registration success is returned while the current location is registered and the transfer of data packets to the mobile computer 2 is started.

Here, when it is judged that the authentication data is not the proper one, the home agent 5 either stops a series of processing by transmitting to the mobile computer 2 a message indicating that the user authentication failed, or transmits to the mobile computer 2 another challenge message containing an information indicating that the user authentication failed. In the latter case, if the proper authentication data is not received even after repeating this message exchange for a prescribed number of times, it is preferable to stop a series of processing by returning a message indicating that the user authentication failed.

Note that the above is directed to an exemplary case of exchanging password, but it is also possible to adopt a scheme in which the one-time password is generated by using a prescribed function stored in the external memory device 32 (or the mobile computer 2) from the first data that is generated at each occasion and given from the home agent 5 and the second data that is entered by the user, and this one-time password is returned from the mobile computer 2 to the home agent 5, and then the home agent 5 checks whether the returned one-time password is the proper one or not according to the first data generated by the home agent 5 itself and the second data and the prescribed function which are stored therein in advance.

Now, in the above described case, it is also preferable to additionally provide a function for making the subsequent data reading from the external memory device 32 impossible when the mobile computer 2 repeats the user authentication failure for a prescribed number of times as in the case where the improper user repeatedly enters incorrect data. In this case, the mobile computer 2 is supplemented with a function configuration as shown in FIG. 18, and the processing according to the flow chart shown in FIG. 19 is carried out as follows.

Figure 18:
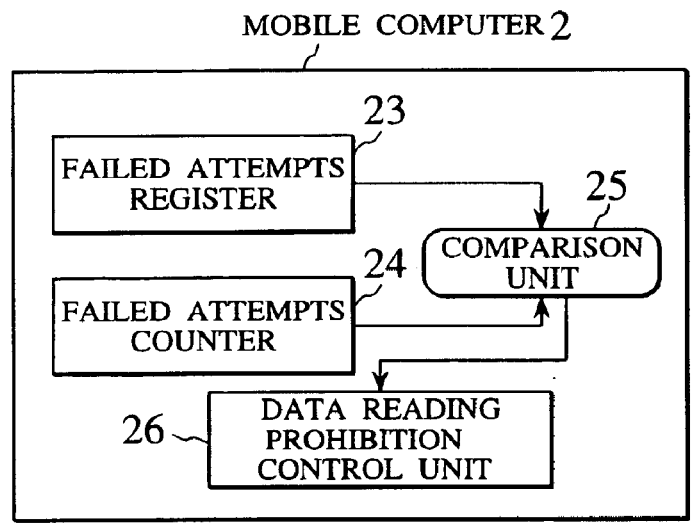
FIG. 18 is a schematic block diagram showing a supplemental functional configuration for a mobile computer that can be used in the second embodiment of the present invention.
Figure 19:
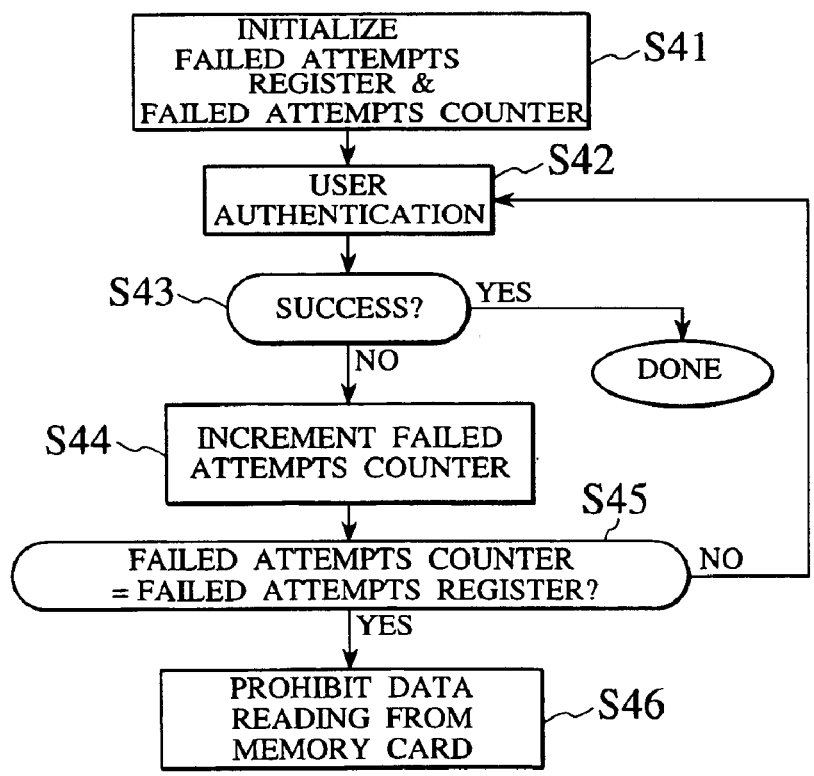
FIG. 19 is a flow chart for an operation by the supplemental functional configuration of FIG. 18.

In the mobile computer 2 having the functional configuration of FIG. 18, the consecutive user authentication failure attempts number specified by the user (or the system manager) in advance is entered in a failed attempts register 23, and a failed attempts counter 24 is initialized to 0 (step S41).

Then, whenever the user authentication is attempted (step S42) and the user authentication is not successful as a message indicating the user authentication failure is received from the home agent 5 (step S43 NO), the failed attempts counter 24 is incremented by one (step S44). On the other hand, when the user authentication is successful (step S43 YES), the failed attempts counter 24 is reset to 0.

Then, the value of the failed attempts register 23 and the value of the failed attempts counter 24 are compared at a comparison unit 25 (step S45), and when they coincide (step S45 YES), the mobile computer 2 activates a data reading prohibition control unit 26 so as to stop all subsequent data reading from the external memory device 32 (step S46).

When the password input failure is repeated for a prescribed number of times as in the above and the subsequent data reading from the external memory device 32 is prohibited by the data reading prohibition control unit 26, it is assumed that the use of a unique information of this mobile computer 2 that is stored in the home agent is necessary in releasing this data reading prohibition.

For example, the user data (set by the system manager at a time of installing) for releasing the data reading prohibition by the data reading prohibition control unit 26 that is managed at the home agent 5 side is issued through an off-line mechanism such as a floppy disk, and the lock at the mobile computer 2 side is released by using this user data.

It is also possible to provide the data reading prohibition control unit 26 in the external memory device 32 instead, and release this data reading prohibition control unit 26 inside the external memory device 32 by entering the user data for releasing the lock into the external memory device 32 using a specialized memory card writer (in the case where the external memory device 32 is a memory card) or the like.

Now, in the above, the case of prohibiting the data reading from the external memory device 32 in the case of the user authentication failure for a prescribed number of times has been described, but alternatively, it is also possible to stop the registration request message transmission from the mobile computer 2 in the case of the user authentication failure for a prescribed number of times. In this case, the function configuration shown in FIG. 11 and the processing according to the flow chart shown in FIG. 12 as described above can be used as follows.

In the mobile computer 2 having the functional configuration of FIG. 11, the consecutive user authentication failure attempts number specified by the user (or the system manager) in advance is entered in a failed attempts register 121, and a failed attempts counter 122 is initialized to 0 (step S21).

Then, whenever the user authentication is attempted (step S22) and the user authentication is not successful as a message indicating the user authentication failure is received from the home agent 5 (step S23 NO), the failed attempts counter 122 is incremented by one (step S24). On the other hand, when the user authentication is successful (step S23 YES), the failed attempts counter 122 is reset to 0.

Then, the value of the failed attempts register 121 and the value of the failed attempts counter 122 are compared at a comparison unit 123 (step S25), and when they coincide (step S25 YES), the mobile computer 2 activates a message transmission stopping control unit 124 so as to stop all subsequent message transmissions (step S26).

When the password input failure is repeated for a prescribed number of times as in the above and the subsequent message transmissions from the mobile computer 2 are stopped by the message transmission stopping control unit 124, it is assumed that the use of a unique information of this mobile computer 2 that is stored in the home agent is necessary in releasing this message transmission stopping.

For example, the user data (set by the system manager at a time of installing) for releasing the message transmission stopping by the message transmission stopping control unit 124 that is managed at the home agent 5 side is issued through an off-line mechanism such as a floppy disk, and the lock at the mobile computer 2 side is released by using this user data.

Next, the additional function to be supplemented at the mobile computer 2 in the case of carrying out the packet encryption in addition to the mobile IP as described cases will be described.

Figure 20:
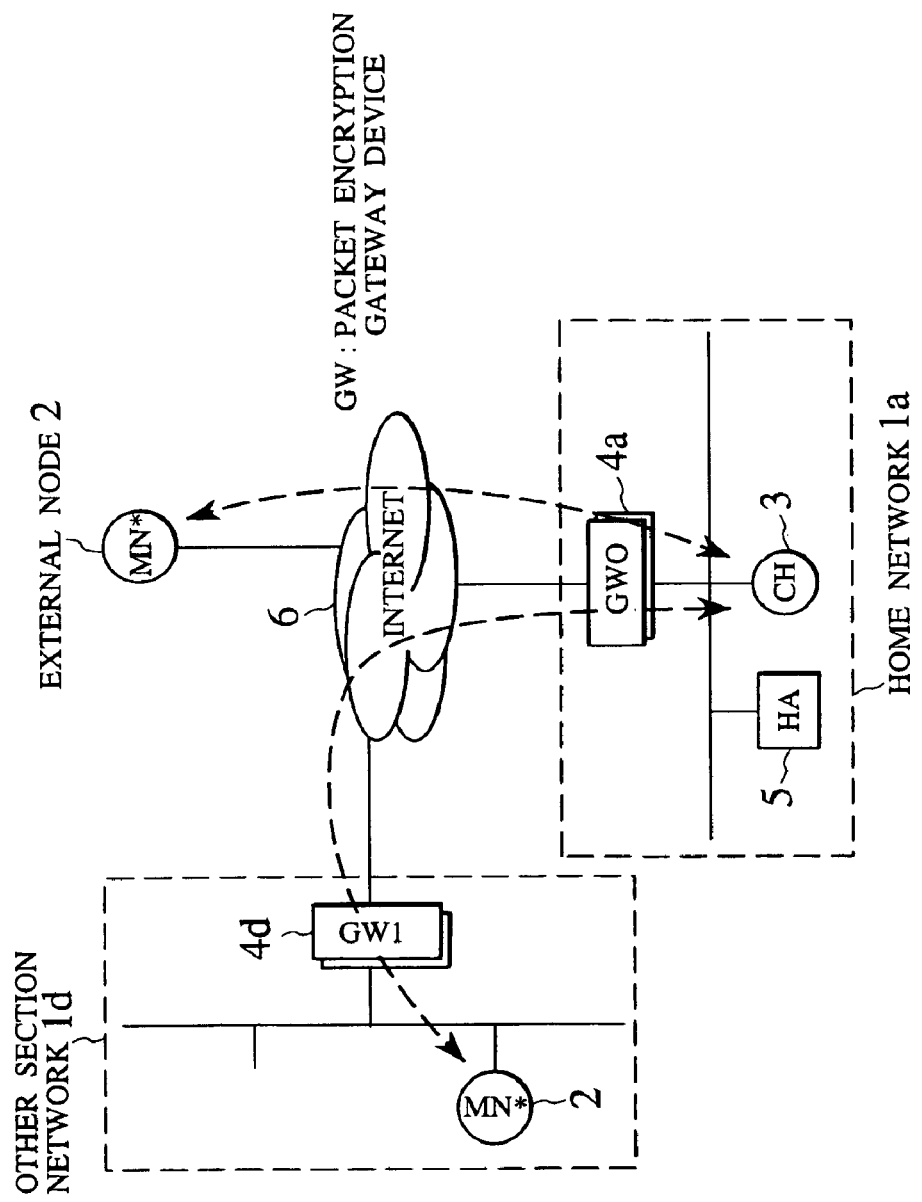
FIG. 20 is a schematic diagram showing an exemplary configuration of a communication system according to the present invention in the case of using packet encryption.

For example, as shown in FIG. 20, this is the case where the home network 1a and the other section network 1d are provided with packet encryption gateway devices 4a and 4d having the cipher communication function, and the mobile computer is connected within the other section network 1d or connected as an external node, where the encryption parameter is exchanged between the mobile computer 2 and the gateway device 4a of the home network 1a and the packets transferred therebetween are encrypted accordingly. Even in this case, the address of the gateway device 4a and the security information (the encryption parameter, etc.) are stored in the external memory device 32 such as a memory card rather than in a body of the mobile computer 2, and the necessary processing is carrying out by reading out these information from the external memory device 32 to the mobile computer 2.

Figure 21:
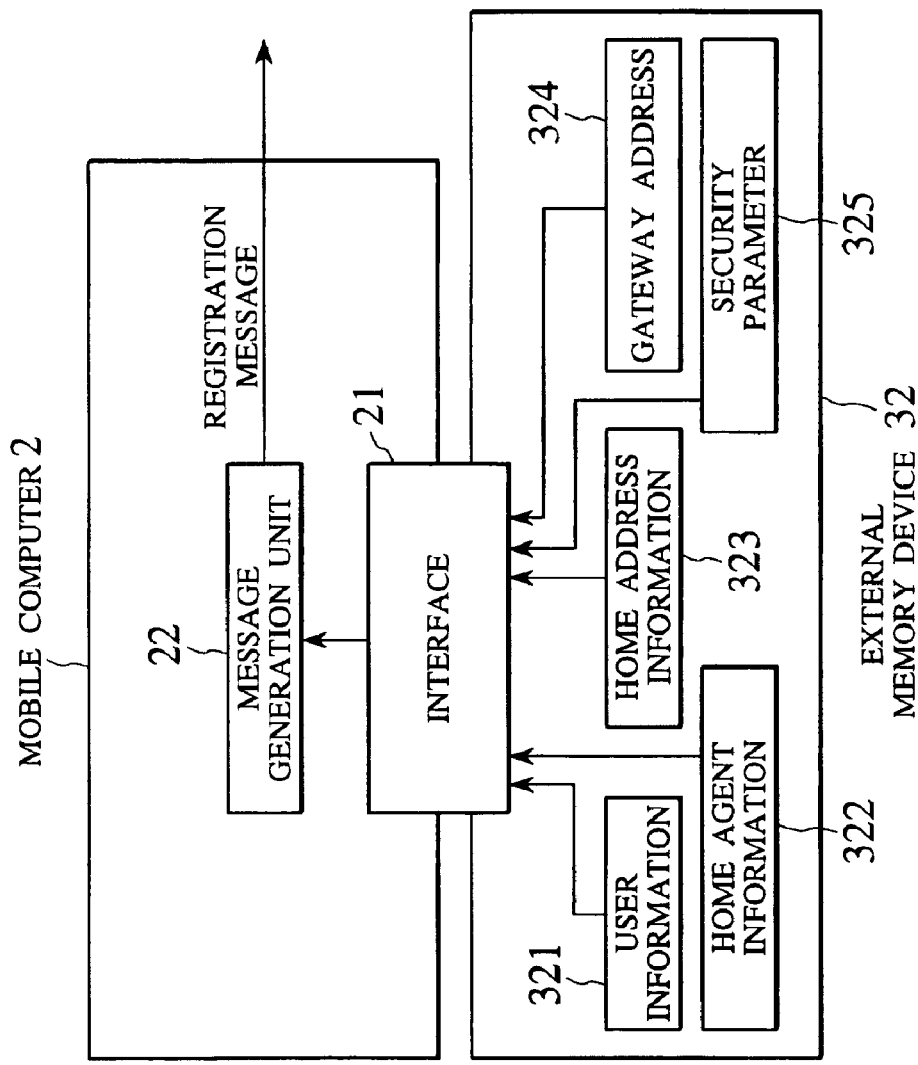
FIG. 21 is a block diagram showing an exemplary configuration of a mobile computer and an external memory device according to the present invention in the case of using packet encryption.

FIG. 21 shows an exemplary schematic configuration of the mobile computer 2 in such a case of reading out the security information from the external memory device 32 as well. In this case, the external memory device 32 stores a gateway address 324 and a security parameter 325 in addition to the user information 321, the home agent information 322, the home address information 323, and the necessary information is read out through the interface 21 and utilized in the cipher communications by the procedure similar to that described above.

Note here that the information stored in the external memory device (such as a memory card) in this second embodiment includes the user information, the network (address) information and the security information, all of which are information which should not be leaked to the external. Consequently, when the information is read out from the external memory device 32 through the interface 21 whenever necessary, the care should be taken so as not to produce any copy on the mobile computer 2.

As described, the security measure provided in the conventional mobile IP scheme is capable of coping with the pretending attack in host basis, but quite vulnerable to the attack of an improper user pretending a legitimate user. For this reason, there has been possibilities for having the secret information on the Internal network improperly taken out to a visited site (external network). In addition, if the mobile computer is stolen, the home network information (such as an IP address of the home agent, its authentication key, addresses of a default router and internal hosts, for example) that is registered in that mobile computer will also be stolen together, so that there is a danger of inducing another attack based on such a stolen information. Thus, such an information from which the internal network information can be guessed should preferably be not maintained on the mobile computer as much as possible from a viewpoint of security.

In this regard, according to this second embodiment, the external memory device for maintaining the user information or the network information regarding the mobile computer is used so that the transmission of the current location registration message of the mobile computer and the formation of the network information can be carried out according to the information stored in this external memory device.

Moreover, no secret information is left on the mobile computer so that it is possible to prevent the stealing of the internal information even in the case where the mobile computer itself is stolen.

Thus, according to this second embodiment, the user information and the network information are stored in the external memory device rather than in the mobile computer, and the user carries this external memory device along with him. Then, the user attaches it to the mobile computer whenever necessary and read out the necessary information from the external memory device to the mobile computer so as to carry out the transmission of the current location registration message of the mobile computer and the formation of the network information, so that neither the information leak nor the communication with the home network is possible by the mobile computer alone which does not store the user information and the network information.

In addition, by carrying out the control in which the reading of the information from the external memory device to the mobile computer is permitted only when the user authentication succeeds, so that both the acquisition of the information from the external memory device and the communication with the home network by the improper user who cannot successfully complete the user authentication can be prevented.

Similarly, by carrying out the control in which the message transmission from the mobile computer using the information read out from the external memory device to the mobile computer is permitted only when the user authentication succeeds, at least the communication with the home network by the improper user who cannot successfully complete the user authentication can be prevented.

Moreover, by carrying out the control in which the reading of the information from the external memory device to the mobile computer or the message transmission from the mobile computer using the information read out from the external memory device to the mobile computer is prohibited in the case of the user authentication failure for a prescribed number of times, it is possible to achieve the even superior security.

As should be apparent from the above description, the basic concept underlying the present invention is that it is desirable not to leave the sensitive personal information on the host as much as possible in the case of the mobile computing, so that the home agent or the memory card is used for the purpose of managing such sensitive information.

Note that the above description is directed to the case of the communication system using the Co-located Care-of Address mode, but the present invention is equally applicable to the communication system assuming the existence of the foreign agent.

Also, the present invention is equally applicable to the various other types of mobile communication protocols other than the mobile IP as specified by RFC 2002.

It also is to be noted that the above described embodiments according to the present invention may be conveniently implemented in forms of software programs for realizing the operations of the mobile computer and the home agent, as will be apparent to those skilled in the computer art. Appropriate software coding can readily be prepared by skilled programmers based on the teachings of the present disclosure, as will be apparent to those skilled in the software art.

In particular, each one of the entire mobile computer and the entire home agent as described above can be conveniently implemented in a form of a software package. Such a software program can be provided in a form of a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A mobile computer device capable of carrying out communications while moving over inter-connected networks, the mobile computer device comprising:

a registration message transmission unit for transmitting a registration message containing an information on a current location of the mobile computer device, from outside a home network of the mobile computer device to a mobile computer management device located at the home network, the mobile computer management device having a function for managing the information on the current location of the mobile computer device and transferring packets destined to the mobile computer device to the current location of the mobile computer device;

a user input unit for accepting a user input for user authentication;

a user-input-based information transmission unit for transmitting to the mobile computer management device a response message containing information based on the user input as a user authentication information, when a challenge message that requests returning of the user authentication information is received from the mobile computer management device in response to the registration message; and an authentication unit for judging a properness of the mobile computer management device according to the challenge message received from the mobile computer management device;

wherein the user-input-based information transmission unit transmits the response message containing the information based on the user input when the mobile computer management device is judged as proper.

2. The mobile computer device of claim 1, wherein the user input based information transmission unit transmits the response message containing a one-time password based on a challenge code contained in the challenge message received from the mobile computer management device as the user input based information.

3. The mobile computer device of claim 1, further comprising:

a message transmission stopping unit for stopping subsequent transmissions of the registration message from the mobile computer device when a message indicating a failure of the user authentication is received from the mobile computer management device for a prescribed number of times consecutively.

4. The mobile computer device of claim 1, wherein the user input based information transmission unit transmits a password entered by a user at the mobile computer device as the user input based information.

5. A mobile computer device capable of carrying out communications while moving over inter-connected networks, the mobile computer device comprising:

an external interface unit for reading out desired information from an external memory device connected to the mobile computer device, wherein the external memory device stores at least a user information and a network information to be used for communications at a visited site;

a user authentication unit for carrying out first user authentication locally at the mobile computer device according to the user information stored in the external memory device and a user input;

a registration message transmission unit for transmitting a registration message containing an information on a current location of the mobile computer device, from outside a home network of the mobile computer device to a mobile computer management device located at the home network, by using the network information read out from the external memory device under a control by the user authentication unit, the mobile computer management device having a function for managing the information on the current location of the mobile computer device and transferring packets destined to the mobile computer device to the current location of the mobile computer device; and a user-input-based information transmission unit for transmitting to the mobile computer management device a user-input-based information to be used for second user authentication at the mobile computer management device;

wherein the user authentication unit permits transmission of the registration message by the registration message transmission unit when the first user authentication succeeds.

6. The mobile computer device of claim 5, wherein the user authentication unit permits reading from the external memory device through the external interface unit when the first user authentication succeeds.

7. The mobile computer device of claim 5, wherein the user information stored in the external memory device contains a personal information of a user who uses the mobile computer device, and the user authentication unit judges that the first user authentication succeeds when a user authentication information stored in the mobile computer device in correspondence to the personal information stored in the external memory device coincides with the user input as entered by the user at a time of connecting the external memory device to the mobile computer device.

8. The mobile computer device of claim 5, further comprising:

a reading prohibiting unit for prohibiting subsequent reading from the external memory device through the external interface unit when the first user authentication fails for a prescribed number of times consecutively.

9. The mobile computer device of claim 5, further comprising:

a message transmission stopping unit for stopping subsequent transmissions of the registration message from the mobile computer device when the first user authentication fails for a prescribed number of times consecutively.

10. The mobile computer device of claim 5, further comprising:

a reading prohibiting unit for prohibiting subsequent reading from the external memory device through the external interface unit when the second user authentication at the mobile computer management device fails for a prescribed number of times consecutively.

11. The mobile computer device of claim 5, further comprising:

a message transmission stopping unit for stopping subsequent transmissions of the registration message from the mobile computer device when the second user authentication at the mobile computer management device fails for a prescribed number of times consecutively.

12. The mobile computer device of claim 5, wherein the network information to be read out from the external memory device contains at least one of a home address information of the mobile computer device, an address information of the mobile computer management device, and an information for host authentication to be carried out between the mobile computer device and the mobile computer management device.

13. The mobile computer device of claim 5, wherein the external memory device also stores a security information with respect to a packet relay device which is capable of processing encrypted packets transmitted from the mobile computer device, and the mobile computer device carries out cipher communications using an encryption processing from the visited site, by using the security information read out from the external memory device through the external interface unit.

14. The mobile computer device of claim 5, further comprising:
an internal memory for temporarily storing the desired information read out from the external memory device, wherein the desired information temporarily stored in the internal memory is deleted when communications using the desired information is finished.

15. The mobile computer device of claim 14, wherein the internal memory stores both the user information and the network information read from the external memory, and wherein the user information is used for the first user authentication performed solely by the mobile computer device.

16. An article of manufacture, comprising:
a computer usable medium having computer readable program code means embodied therein for causing a computer to function as a mobile computer capable of carrying out communications while moving over inter-connected networks, the computer readable program code means includes:
first computer readable program code means for causing said computer to transmit a registration message containing an information on a current location of the mobile computer, from outside a home network of the mobile computer to a mobile computer management device located at the home network, the mobile computer management device having a function for managing the information on the current location of the mobile computer and transferring packets destined to the mobile computer to the current location of the mobile computer; and
second computer readable program code means for causing said computer to accept a user input for user authentication;
third computer readable program code means for causing said computer to transmit to the mobile computer management device a response message containing information based on the user input as a user authentication information, when a challenge message that requests returning of the user authentication information is received from the mobile computer management device in response to the registration message; and
fourth computer readable program code means for causing said computer to judge a properness of the mobile computer management device according to the challenge message received from the mobile computer management device;
wherein the user-input-based information transmission unit transmits the response message containing the information based on the user input when the mobile computer management device is judged as proper.

17. An article of manufacture, comprising:
a computer usable medium having computer readable program code means embodied therein for causing a computer to function as a mobile computer device capable of carrying out communications while moving over inter-connected networks, the computer readable program code means includes:
first computer readable program code means for causing said computer to read out desired information from an external memory device connected to the mobile computer device, wherein the external memory device stores at least a user information and a network information to be used for communications at a visited site;
second computer readable program code means for causing said computer to carry out first user authentication locally at the mobile computer device according to the user information stored in the external memory device and a user input;
third computer readable program code means for causing said computer to transmit a registration message containing an information on a current location of the mobile computer device, from outside a home network of the mobile computer device to a mobile computer management device located at the home network, by using the network information read out from the external memory device under a control by the second computer readable program code means, the mobile computer management device having a function for managing the information on the current location of the mobile computer device and transferring packets destined to the mobile computer device to the current location of the mobile computer device; and
fourth computer readable program code means for causing said computer to transmit to the mobile computer management device a user-input-based information to be used for second user authentication at the mobile computer management device;
wherein the second computer readable program code means permits transmission of the registration message by the third computer readable program code means when the first user authentication succeeds.

* * * * *